United States Patent
Kawagoshi (10) Patent No.: US 7,177,167 B2
(45) Date of Patent: Feb. 13, 2007

(54) SEMICONDUCTOR DEVICE CONTAINING CHARGE PUMP TYPE STEP-UP CIRCUIT FEATURING BIPOLAR TRANSISTOR FOR CARRYING OUT INITIAL CHARGING

(75) Inventor: Hirokazu Kawagoshi, Ohtsu (JP)

(73) Assignee: NEC Electronics Corporation, Kanagawa (JP)

( * ) Notice: Subject to any disclaimer, the term of this patent is extended or adjusted under 35 U.S.C. 154(b) by 0 days.

(21) Appl. No.: 11/478,642

(22) Filed: Jul. 3, 2006

(65) Prior Publication Data

US 2007/0008029 A1    Jan. 11, 2007

(30) Foreign Application Priority Data

Jul. 5, 2005    (JP)    ............... 2005-196377

(51) Int. Cl.
*H02M 3/18*    (2006.01)
*H02M 7/00*    (2006.01)

(52) U.S. Cl. ............ 363/60; 327/536; 327/537

(58) Field of Classification Search .......... 363/59, 363/60; 327/536, 537
See application file for complete search history.

(56) References Cited

U.S. PATENT DOCUMENTS 6,535,052 B2 *    3/2003    Myono    ............... 327/536
6,801,033 B2 *    10/2004    Sudo et al.    ............... 324/158.1
6,862,201 B2 *    3/2005    Hodge, Jr.    ............... 363/89

FOREIGN PATENT DOCUMENTS

JP    9-191571    7/1997

* cited by examiner

*Primary Examiner*—Bao Q. Vu
(74) *Attorney, Agent, or Firm*—Young & Thompson (57) ABSTRACT

A semiconductor device includes a first conductivity type semiconductor substrate, and a charge pump type step-up circuit formed in the semiconductor substrate. The step-up circuit includes a charge pump circuit and a bipolar transistor. The charge pump circuit has an input line to which a power supply voltage is to be applied, and an output line through which an output voltage is to be output. The bipolar transistor is formed in the semiconductor substrate so as to be provided between the input line and the output line. The bipolar transistor is constituted so as to be turned ON when an absolute value of the output voltage is lower than an absolute value of the power supply voltage, and so as to be turned OFF when the absolute value of the output voltage is higher than the absolute value of the power supply voltage.

20 Claims, 5 Drawing Sheets

SEMICONDUCTOR DEVICE CONTAINING CHARGE PUMP TYPE STEP-UP CIRCUIT FEATURING BIPOLAR TRANSISTOR FOR CARRYING OUT INITIAL CHARGING

BACKGROUND OF THE INVENTION

1. Field of the Invention

The present invention relates to a semiconductor device containing a charge pump type step-up circuit.

2. Description of the Related Art

A prior art semiconductor device containing a charge pump type step-up circuit is disclosed in, for example, JP-H9-191571-A. When this prior art semiconductor device is mounted on a wiring board for a suitable electronic product, a step-up capacitor and a smoothing capacitor are provided on the wiring board as a part of the charge pump type step-up circuit so that an operation of the charge pump type step-up circuit can be ensured. Note that both the step-up capacitor and the smoothing capacitor are generally external to the semiconductor device.

The charge pump type step-up circuit includes a charge pump circuit having an input line to which a power supply voltage is applied, and an output line through which an output voltage is output. The step-up capacitor is connected to the charge pump circuit at the terminals thereof so as to be charged with the power supply voltage which is stepped up to a stepped-up voltage to be input through the output line. On the other hand, one terminal of the smoothing capacitor is grounded, and the other terminal of the smoothing capacitor is connected to the input line through a diode-connected MOS transistor.

In starting of the charge pump type step-up circuit, the smoothing capacitor is initially charged through the diode-connected MOS transistor until the charged voltage of the smoothing capacitor reaches the power supply voltage. As soon as the charged voltage of the smoothing capacitor reaches the power supply voltage, an operation of the charge pump circuit is substantially commenced.

In the operation of the charge pump circuit, a first terminal of the step-up capacitor is grounded, and a second terminal of the step-up capacitor is charged to the power supply voltage. Then, while the first terminal of the step-up capacitor is pulled up by the power supply voltage from the zero voltage to the power supply voltage, the second terminal of the step-up capacitor is pulled up by the power supply voltage to a voltage twice the power supply voltage, so that the voltage twice the power supply voltage is output as the output voltage through the output line. Thus, it is possible to immediately and stably output the stepped-up voltage through the output line, due to the initial charging of the smoothing capacitor.

SUMMARY OF THE INVENTION

It has now been discovered that the above-mentioned prior art semiconductor device has a problem to be solved as mentioned hereinbelow.

For example, when the diode-connected MOS transistor is of a p-channel type, and when the semiconductor device uses a p-type semiconductor substrate, the diode-connected p-channel type MOS transistor is formed in an n-well impurity well defined in the p-type semiconductor substrate. On the other hand, the semiconductor device justly includes an n-channel type MOS transistor formed in the p-channel type semiconductor device. In this case, the diode-connected p-channel type MOS transistor inevitably involves a parasitic PNP bipolar transistor, and the n-channel type MOS transistor inevitably involves a parasitic NPN bipolar transistor.

As stated hereinafter in detail, in the starting of the charge pump type step-up circuit, both the parasitic PNP bipolar transistor and the parasitic NPN bipolar transistor may be turned ON, resulting in occurrence of a latch-up state in which a large amount of current flows through both the parasitic PNP bipolar transistor and the parasitic NPN bipolar transistor. When the latch-up state occurs, it is impossible to break off the latch-up state until the charge pump type step-up circuit is once powered OFF. In order to ensure a proper operation of the charge pump type step-up circuit, it is necessary to prevent the turn-ON state of the parasitic PNP bipolar transistor involved in the diode-connected p-channel type MOS transistor.

Conventionally, for the prevention of the turn-ON state of the parasitic PNP bipolar transistor, it is proposed that an external Schottky diode be provided on the wiring board so as to be connected to the source and the drain of the diode-connected p-channel type MOS transistor, but the provision of the external Schottky diode should be avoided, so that an electronic product using the semiconductor device can be manufactured at a low cost.

In accordance with an aspect of the present invention, there is provided a semiconductor device comprising a first conductivity type semiconductor substrate, and a charge pump type step-up circuit formed in the semiconductor substrate. The charge pump type step-up circuit includes a charge pump circuit having an input line to which a power supply voltage is to be applied, and an output line through which an output voltage is to be output. The charge pump type step-up circuit also includes a bipolar transistor formed in the semiconductor substrate so as to be provided between the input line and the output line. The bipolar transistor is constituted so as to be turned ON when an absolute value of the output voltage is lower than an absolute value of the power supply voltage, and so as to be turned OFF when the absolute value of the output voltage is higher than the absolute value of the power supply voltage.

In accordance with another aspect of the present invention, there is provided a charge pump type set-up circuit formed in a first conductivity type semiconductor device. The charge pump type set-up comprises a charge pump circuit having an input line to which a power supply voltage is to be applied, and an output line through which an output voltage is to be output. The charge pump type step-up circuit also comprises a bipolar transistor provided between the input line and the output line. The bipolar transistor is constituted so as to be turned ON when an absolute value of the output voltage is lower than an absolute value of the power supply voltage, and so as to be turned OFF when the absolute value of the output voltage is higher than the absolute value of the power supply voltage.

The bipolar transistor may be formed as a vertical type bipolar transistor. Also, the bipolar transistor may be defined by a second conductivity type well formed in the first conductivity type semiconductor substrate, a first conductivity type well formed in the second conductivity type well, and a second conductivity type region formed in the first conductivity type well. The second conductivity type well and the first conductivity type well are connected to the input line, and the second conductivity type region is connected to the output line.

The first conductivity type may be of a p-type, and the second conductivity type may be of an n-type. In this case, the bipolar transistor has a first terminal connected to the input line, a second terminal connected to the output line, and a base terminal connected to the input line. When the absolute value of the output voltage is lower than the absolute value of the power supply voltage, the first and second terminals serve as respective collector and emitter terminals. When the absolute value of the output voltage is higher than the absolute value of the power supply voltage, the bipolar transistor is changed into a bipolar transistor in which the first and second terminals serve as respective emitter and collector terminals.

On the other hand, the first conductivity type may be of an n-type, and the second conductivity type may be of a p-type. In this case, the bipolar transistor has a first terminal connected to the input line, a second terminal connected to the output line, and a base terminal connected to the input line. When the absolute value of the output voltage is lower than the absolute value of the power supply voltage, the first and second terminals serve as respective collector and emitter terminals. When the absolute value of the output voltage is higher than the absolute value of the power supply voltage, the bipolar transistor is changed into a bipolar transistor in which the first and second terminals serve as respective emitter and collector terminals.

The charge pump circuit may be adapted to be connected to a step-up capacitor so that the step-up capacitor is charged with the power supply voltage to thereby produce a stepped-up voltage which is to be output through the output line. Also, the bipolar transistor may be adapted to be connected to a smoothing capacitor so that the smoothing capacitor is initially charged with the power supply voltage while the bipolar transistor is turned ON.

The semiconductor device may further comprise first, second, third, fourth and fifth terminals. In this case, the input line is connected to the first terminal. Two respective terminals of the step-up capacitor are adapted to be connected to the second and third terminals. The charge pump circuit is adapted to be grounded through the fourth terminal. One terminal of the smoothing capacitor is adapted to be grounded, and the other terminal of the smoothing capacitor is adapted to be connected to the output line and the second terminal of the bipolar transistor through the fifth terminal.

The step-up capacitor and the smoothing capacitor may be external to the semiconductor device.

BRIEF DESCRIPTION OF THE DRAWINGS

The present invention will be more clearly understood from the description set forth below, with reference to the accompanying drawings, wherein.

DESCRIPTION OF THE PREFERRED EMBODIMENTS

Before the description of the preferred embodiments of the present invention, for better understanding of the present invention, a prior art semiconductor device containing a charge pump type step-up circuit will be now explained with reference to FIGS. 1, 2A, 2B and 3.

Figure 1:
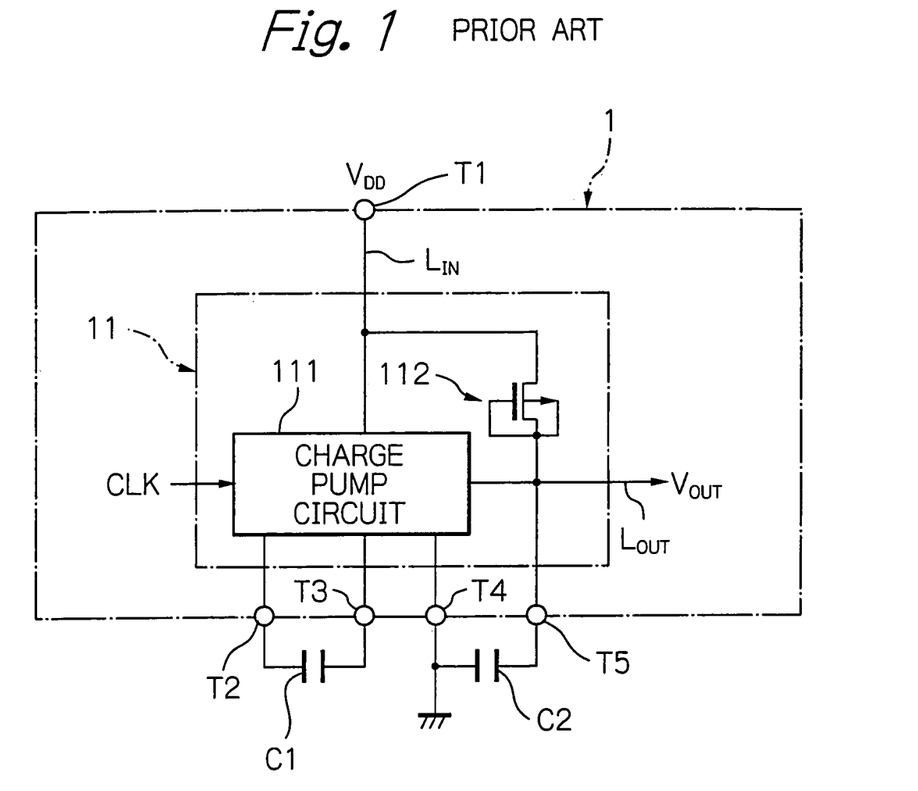
FIG. 1 is a schematic block circuit diagram illustrating a prior art semiconductor device containing a charge pump type step-up circuit.

First, referring to FIG. 1 which schematically shows the prior art semiconductor device in a block circuit diagram, the semiconductor device is generally indicated by reference numeral 1. The semiconductor device 1 is mounted on a wiring board (not shown) for a suitable electronic product, and contains a charge pump type step-up circuit 11 including a charge pump circuit 111, and a p-channel type MOS transistor 112 connected to the charge pump circuit 111. Also, the semiconductor device 1 is provided with external terminals T1, T2, T3, T4 and T5 for operating the charge pump step-up circuit 11.

The charge pump circuit 111 has an input line $L_{IN}$ connected to the terminal T1, and a power supply voltage $V_{DD}$ is supplied from a power supply source (not shown) via the terminal T1 to the charge pump circuit 111. Also, the charge pump circuit 111 has an output line $L_{OUT}$ through which an output voltage $V_{OUT}$ is output. As will be stated hereinafter, the charge pump circuit 111 is driven by a clock signal CLK input thereto, with the clock signal CLK being generated by a clock signal generator (not shown), which is incorporated in the semiconductor device 1.

The charge pump type step-up circuit 11 also includes two external capacitors, i.e., a step-up capacitor C1 and a smoothing capacitor C2 which are provided on the aforesaid wiring board (not shown). The step-up capacitor C1 is connected to the charge pump circuit 111 through the terminals T2 and T3. Also, the smoothing capacitor C2 is connected to the charge pump circuit 111 through the terminal T4, and is connected to the output line $L_{OUT}$ through the terminal T5, with the output line $L_{OUT}$ being connected to the source of the p-channel type MOS transistor 112.

The drain of the p-channel type MOS transistor 112 is connected to the input line $L_{IN}$, and the gate of the p-channel type MOS transistor 112 is connected to the source thereof so that the p-channel type MOS transistor 112 serves as a diode. Namely, the p-channel type MOS transistor 112 is used as a diode-connected p-channel type MOS transistor.

Figure 2A:
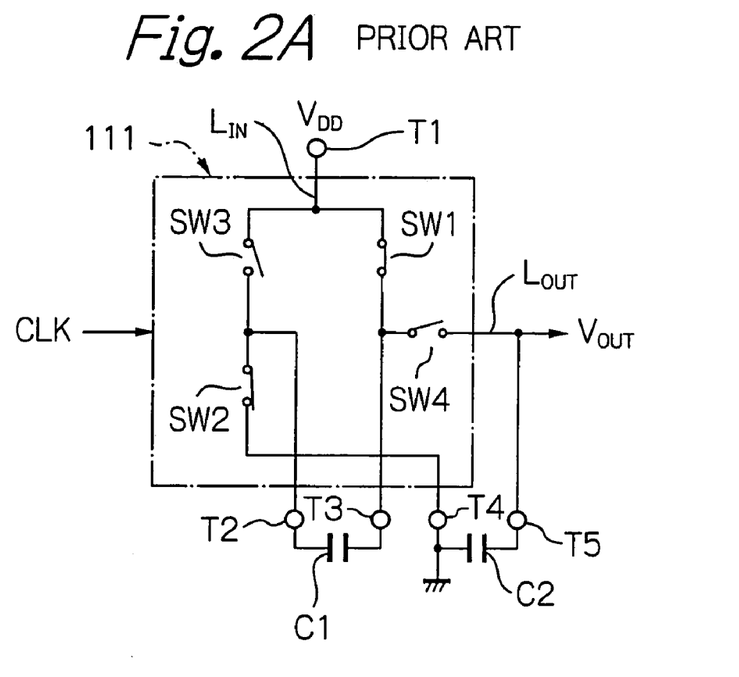
FIG. 2A is a schematic block circuit diagram of the charge pump circuit included in the charge pump type step-up circuit of FIG. 1.

Next, referring to FIG. 2A which is a schematic circuit diagram of the charge pump circuit 111 of FIG. 1, the charge pump circuit 111 includes four switches SW1, SW2, SW3 and SW4 which are arranged as illustrated. In particular, the switch SW1 is connected between the terminals T1 and T3; the switch SW2 is connected between the terminals T2 and T4; the switch SW3 is connected between the terminals T1 and T2; and the switch SW4 is connected between the terminals T3 and T5.

The set of the switches SW1 and SW2 and the set of the switches SW3 and SW4 are alternately and complementarily turned ON and OFF in accordance with the clock signal CLK. Namely, while the clock signal CLK is at a high level, the set of the switches SW1 and SW2 are maintained at an ON-state whereas the set of the switches SW3 and SW4 are maintained at an OFF-state. On the other hand, while the clock signal CLK is at a low level, the set of the switches SW1 and SW2 are maintained at an OFF-state whereas the set of the switches SW3 and SW4 are maintained at an ON-state.

Figure 2B:
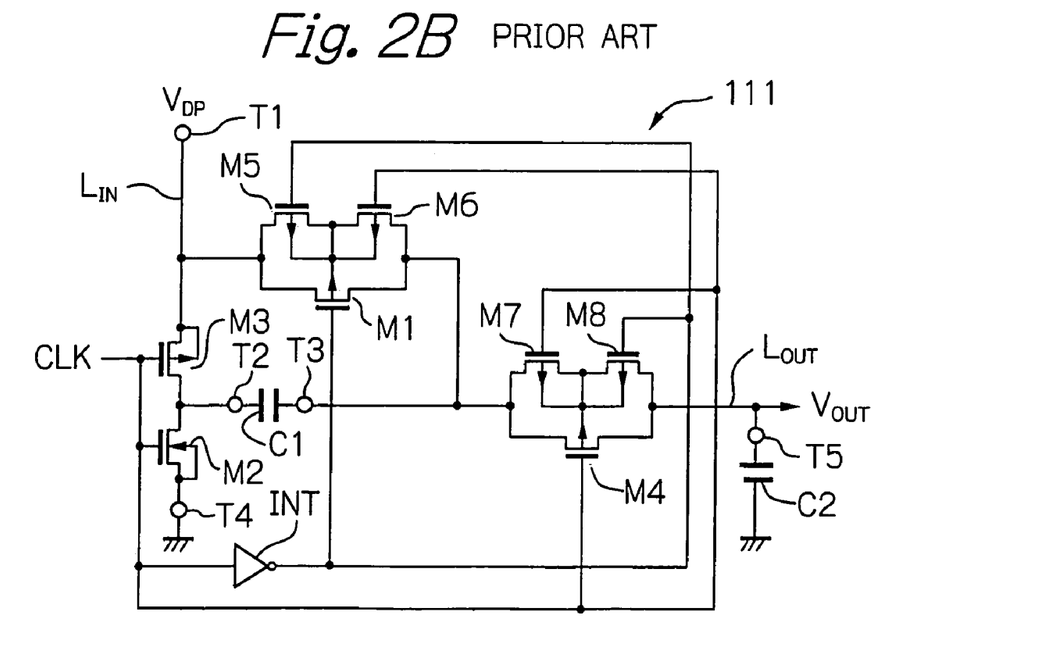
FIG. 2B is a detailed circuit diagram of the charge pump circuit of FIG. 2A.

As shown in FIG. 2B which is a detailed view of the charge pump circuit 111 of FIG. 2A, the respective switches SW1, SW2, SW3 and SW4 may be formed as MOS transistors M1, M2, M3 and M4.

The MOS transistor M1 is of a p-channel enhancement type, and the source and the drain of the MOS transistor M1 are connected to the respective terminals T1 and T3. Also, the gate of the MOS transistor M1 is connected to the output terminal of an inverter INV, through the input terminal of which the clock signal CLK is input thereto, so that the inverted clock signal of the clock signal CLK is input to the gate of the MOS transistor M1. The MOS transistor M1 inevitably involves a parasitic bipolar transistor, and the back gate voltage of the MOS transistor M1 is controlled by MOS transistors M5 and M6 so that the parasitic bipolar transistor is prevented from being turned ON while the charge pump circuit 111 is operated. The MOS transistor M2 is of a n-channel enhancement type, and the drain and source of the MOS transistor M2 are connected to the respective terminals T2 and T4. The clock signal CLK is directly input to the gate of the MOS transistor M2.

The MOS transistor M3 is of a p-channel enhancement type, and the source and drain of the MOS transistor M3 are connected to the respective terminals T1 and T2. The clock signal CLK is directly input to the gate of the MOS transistor M3.

The MOS transistor M4 is of a p-channel enhancement type, and the drain and source of the MOS transistor M4 are connected to the respective terminals T3 and T5. The clock signal CLK is directly input to the gate of the MOS transistor M4. Similar to the MOS transistor M1, the MOS transistor M4 inevitably involves a parasitic bipolar transistor, and the back gate voltage of the MOS transistor M4 is controlled by MOS transistors M7 and M8 so that the parasitic bipolar transistor is prevented from being turned ON while the charge pump circuit 111 is operated.

With the arrangement shown in FIG. 2B, the set of the MOS transistors M1 and M2 (SW1 and SW2) and the set of the MOS transistors M3 and M4 (SW3 and SW4) are alternately and complementarily turned ON and OFF in accordance with the clock signal CLK.

Next, the operation of the above-mentioned charge pump type step-up circuit 11 is explained below.

The charge pump type step-up circuit 11 is initiated by applying the power supply voltage $V_{DD}$ to the terminal T1, but the clock signal CLK is still not input to the charge pump circuit 111 in this initiated state. Namely, right after the power supply voltage $V_{DD}$ to the terminal T1, the charge pump circuit 111 is still not driven.

When the power supply voltage $V_{DD}$ is initially applied to the terminal T1, a current flows forwardly through the diode-connected p-channel type MOS transistor 112 (see: FIG. 1), and thus the smoothing capacitor C2 is charged until the charged voltage of the smoothing capacitor C2 reaches the power supply voltage $V_{DD}$. As soon as the charged voltage of the smoothing capacitor C2 reaches the power supply voltage $V_{DD}$, the clock signal generator (not shown) commences to input the clock signal CLK to the charge pump circuit 111.

By the inputting of the clock signal CLK to the charge pump circuit 111, first, the set of the switches SW1 and SW2 are turned ON, and the set of the switches SW3 and SW4 are turned OFF (see: FIG. 2A). Thus, one terminal of the step-up capacitor C1 is grounded, and the other terminal of the step-up capacitor C1 is charged to the power supply voltage.

Then, when the set of the switches SW1 and SW2 are turned OFF, and when the set of the switches SW3 and SW4 are turned ON, the one terminal of the step-up capacitor C1 is pulled up by the power supply voltage $V_{DD}$ from the zero voltage to the power supply voltage $V_{DD}$, and the other terminal of the step-up capacitor C1 is pulled up by the power supply voltage $V_{DD}$ to a voltage twice the power supply voltage $V_{DD}$. Namely, a potential of the other terminal of the pull-up capacitor C1, which is connected to the terminal T3, is pulled up to $2 \cdot V_{DD}$, and thus the voltage of $2 \cdot V_{DD}$ is output as the output voltage $V_{OUT}$ through the output line $L_{OUT}$ at the initially-charged smoothing capacitor C2. Thus, as long as the clock signal CLK is input to the charge pump circuit 111, the output voltage $V_{OUT}$ ($2 \cdot V_{DD}$) is continuously output from the charge pump type step-up circuit 11. In short, it is possible to immediately and stably step up the output voltage $V_{OUT}$ to $2 \cdot V_{DD}$, due to the initial charging of the smoothing capacitor C2.

Figure 3:
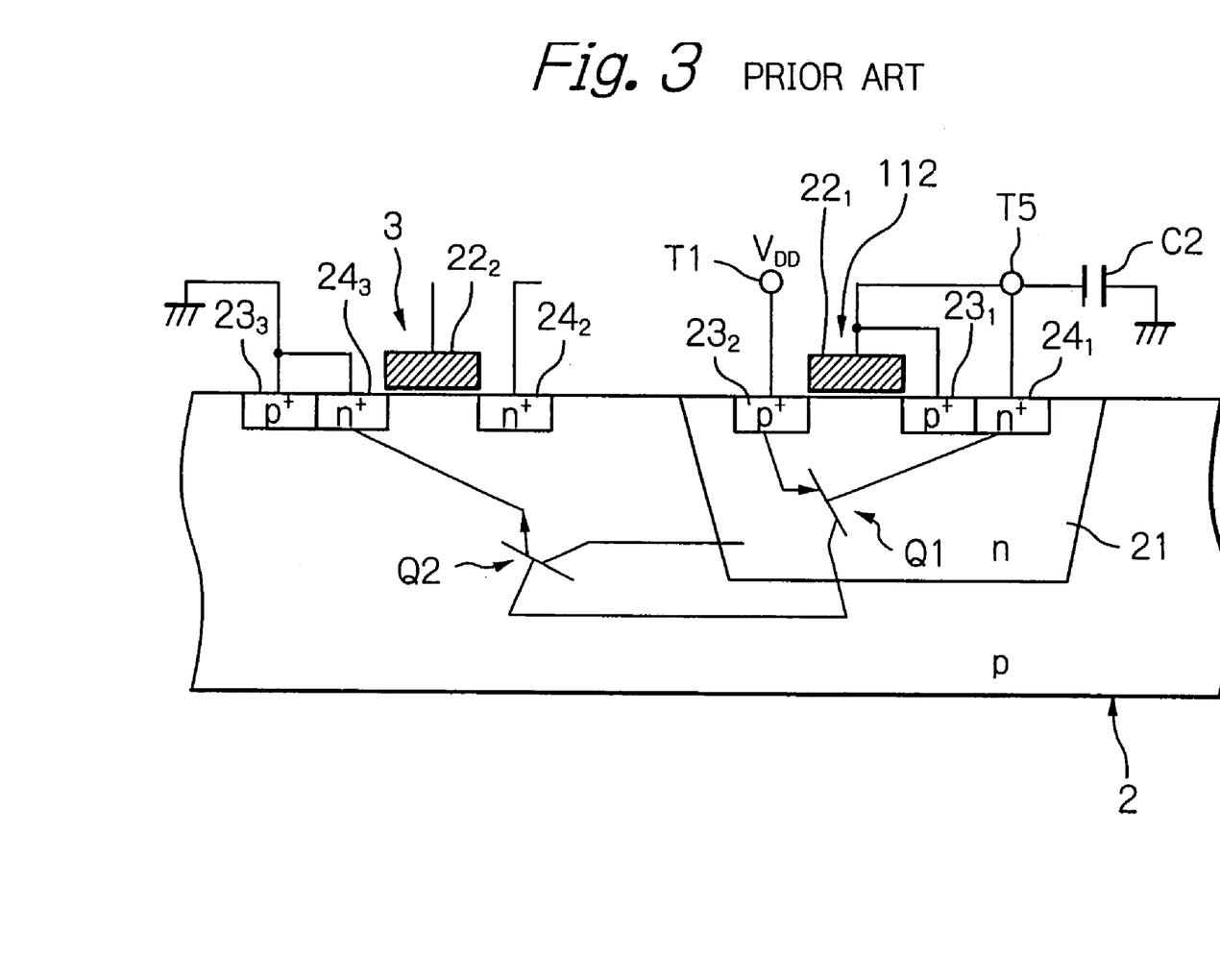
FIG. 3 is a partial cross-sectional view of the semiconductor device of FIG. 1.

Referring to FIG. 3 which is a schematic partial cross-sectional view of the semiconductor device 1 of FIG. 1, reference numeral 2 indicates a p-type semiconductor substrate of the semiconductor device 1 of FIG. 1, which may be made from a monocrystalline silicon wafer.

Incidentally, in addition to the diode-connected p-channel type MOS transistor 112 and the MOS transistors M1 through M8, the semiconductor device 1 justly includes a plurality of p-channel type MOS transistors and a plurality of n-channel type MOS transistors. Each of the p-channel type MOS transistors is formed in an n-type impurity well defined in the p-type semiconductor substrate 2, and each of the n-channel type MOS transistors is formed in the p-type semiconductor substrate 2.

In FIG. 3, one of the aforesaid n-channel type MOS transistors is representatively indicated by reference numerals 3. The p-channel type MOS transistor 112 and the n-channel MOS transistor 3 are simultaneously formed in the p-type semiconductor substrate 2, as explained below.

First, an n-type impurity well 21 is defined in the p-type semiconductor substrate 2 by using an n-type impurity ($As^+$, $P^+$) implanting process. Then, respective gate electrodes $22_1$ and $22_2$ are formed on the n-type impurity well 21 and the p-type semiconductor substrate 2 by using a photolithography process and etching process and so on.

Next, $p^+$-type impurity regions $23_1$, $23_2$ and $23_3$ are formed in the n-type impurity well 21 and the p-type semiconductor substrate 2 by using a p-type impurity ($B^+$) implanting process. Then, $n^+$-type impurity regions $24_1$, $24_2$ and $24_3$ are formed in the n-type impurity well 21 and the p-type semiconductor substrate 2 by using an n-type impurity ($As^+$, $P^+$) implanting process. Note, the formation of the $n^+$-type impurity regions $24_1$, $24_2$ and $24_3$ may be prior to the formation of the $p^+$-type impurity regions $23_1$, $23_2$ and $23_3$.

As shown in FIG. 3, the $p^+$-type impurity regions $23_1$ and $23_2$ are spaced apart from each other, and the gate electrode $22_1$ is provided so as to bridge the space between the $p^+$-type impurity regions $23_1$ and $23_2$ to thereby define a channel region therebetween. Namely, the p-channel type MOS transistor 112 is defined by the gate electrode $22_1$ and the $p^+$-type impurity regions $23_1$ and $23_2$.

In the p-channel type MOS transistor 112, the respective $p^+$-type impurity regions $23_1$ and $23_2$ may be defined as a source region and a drain region. The $p^+$-type source region $23_1$ is connected to the gate electrode $22_1$, and thus the p-channel type MOS transistor 112 is defined as the diode-connected MOS transistor. Both the gate electrode $22_1$ and the p$^+$-type source region $23_1$ are connected to the terminal T5, and the p$^+$-type drain region $23_2$ is connected to the terminal T1. Note, the n$^+$-type impurity regions 24, serves as a back gate contact region for the back gate region or the n-type impurity well 21, and is connected to the terminal T5.

Also, as shown in FIG. 3, the n$^+$-type impurity regions $24_2$ and $24_3$ are spaced apart from each other, and the gate electrode $22_2$ is provided so as to bridge the space between the n$^+$-type impurity regions $24_2$ and $24_3$ to thereby define a channel region therebetween. Namely, the n-channel type MOS transistor 3 is defined by the gate electrode $22_2$ and the n$^+$-type impurity regions $24_2$ and $24_3$.

In the n-channel type MOS transistor 3, the gate electrode $22_2$ is connected to a suitable electronic element (not shown) formed in the p-type semiconductor substrate 2. Also, the respective n$^+$-type impurity regions $24_2$ and $24_3$ are defined as a drain region and a source region. The n$^+$-type drain region $24_2$ is connected to a suitable electronic element (not shown) formed in the p-type semiconductor substrate 2, and the n$^+$-type source region $24_3$ is grounded. Note, the p$^+$-type impurity region $23_3$ serves as a back gate contact region for the back gate region or the p-type semiconductor substrate 2, and is grounded.

With the aforesaid arrangement of the p-channel type MOS transistor 112 and the n-channel type MOS transistor 3, as symbolically shown in FIG. 3, a parasitic PNP bipolar transistor Q1 is inevitably defined by the p$^+$-type source region $23_2$, the n-type impurity well 21 and the p-type semiconductor substrate 2, and a parasitic NPN bipolar transistor Q2 is inevitably defined by the n-type impurity well 21, the p-type semiconductor substrate 2 and the n$^+$-type source region $24_3$.

In the starting of the charge pump type step-up circuit 11, while the smoothing capacitor C2 is initially charged by applying the power supply voltage $V_{DD}$ to the terminal T1, a current flows forwardly from the p$^+$-type source region $23_2$ into the n-type impurity well 21, and thus a potential of the terminal T5 is pulled up by the power supply voltage $V_{DD}$ so that the parasitic PNP bipolar transistor Q1 is turned ON. As a result, a potential of the p-type semiconductor substrate 2 is pulled up by the power supply voltage $V_{DD}$, and thus the parasitic NPN bipolar transistor Q2 may be also turned ON.

When both the parasitic transistors Q1 and Q2 are turned ON, the charge pump type step-up circuit 11 can be no longer operated, because the turn-ON state of both the parasitic transistors Q1 and Q2 results in occurrence of a latch-up state in which a large amount of current flows through the parasitic transistors Q1 and Q2. When the latch-up state occurs, it is impossible to break off the latch-up state until the charge pump type step-up circuit 11 is once powered OFF. In order to ensure a proper operation of the charge pump type step-up circuit 11, it is necessary to prevent the turn-ON state of the parasitic PNP bipolar transistor Q1.

Conventionally, for the prevention of the turn-ON state of the parasitic PNP bipolar transistor Q1, it is proposed that an external Schottky diode be provided on the wiring board (not shown) so as to be connected to the source and the drain of the p-channel type MOS transistor 112, with the external Schottky diode exhibiting a forward voltage ($V_f$) which is smaller than that of the p-n junction between the p$^+$-type source region $23_1$ and the n-type impurity well 21. Of course, the provision of the external Schottky diode results in an increase in production cost of an electronic product using the semiconductor device 1.

First Embodiment

Next, with reference to FIGS. 4A and 4B which respectively correspond to FIGS. 1 and 3, a first embodiment of a semiconductor device according to the present invention is explained below.

Figure 4A:
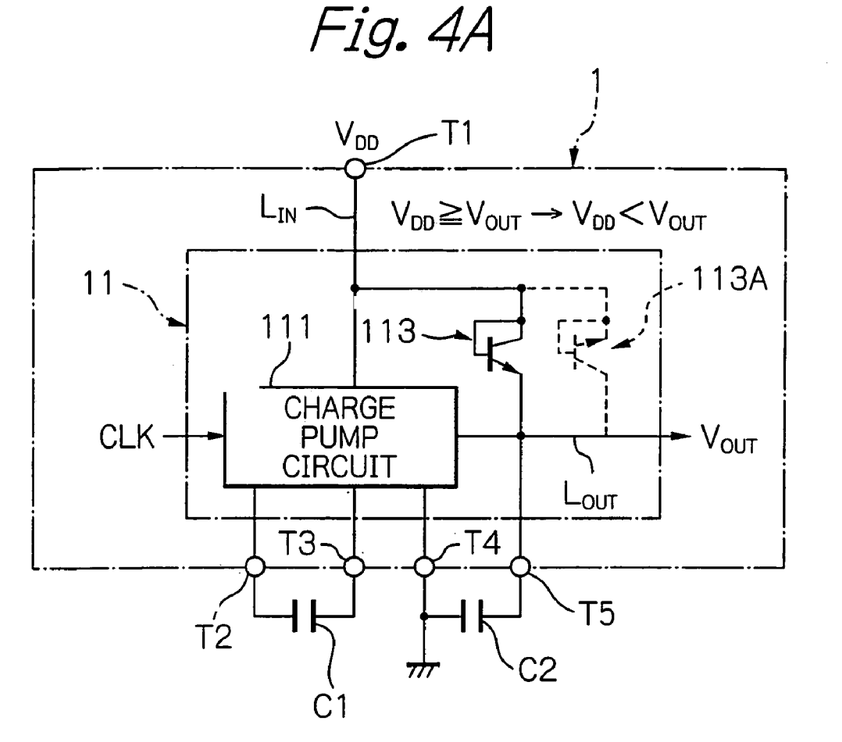
FIG. 4A is a schematic block circuit diagram of a first embodiment of a semiconductor device containing a charge pump type step-up circuit according to the present invention.

As shown in FIG. 4A, the semiconductor device according to the present invention is substantially identical to the prior semiconductor device 1 of FIG. 1 except that a vertical type NPN bipolar transistor 113 is substituted for the diode-connected p-channel type MOS transistor 112 in the charge pump type step-up circuit 11.

Figure 4B:
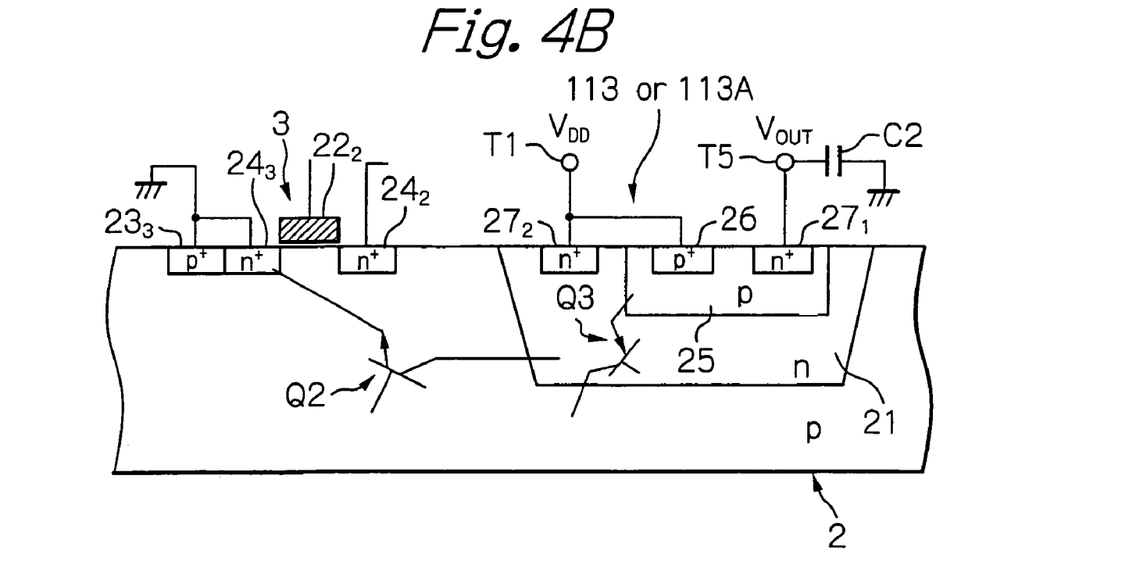
FIG. 4B is a partial cross-sectional view of the semiconductor device of FIG. 4A.

As shown in FIG. 4B, the NPN bipolar transistor 113 is formed in the p-type semiconductor substrate 2, and the formation of the NPN bipolar transistor 113 may be simultaneously carried out when the n-channel MOS transistor 3 is formed in the p-type semiconductor substrate 2.

In particular, after the formation of the n-type impurity well 21, a p-type impurity well 25 is formed in the n-type impurity well 21 by using a p-type impurity (B$^+$) implanting process. Then, when the p$^+$-type impurity region or back gate contact region $23_3$ is formed in the p-type semiconductor substrate 2, a p$^+$-type impurity region 26 is simultaneously formed in the p-type impurity well 25 by using a p-type impurity (B$^+$) implanting process. Next, when the n$^+$-type impurity regions $24_2$ and $24_3$ are formed in the p-type semiconductor substrate 2, respective n$^+$-type impurity regions $27_1$ and $27_2$ are simultaneously formed in the p-type impurity well 25 and the n-type impurity well 21. In short, the NPN bipolar transistor 113 is defined by the n-type impurity well 21, the p-type impurity well 25 and the n$^+$-type impurity region $27_1$.

In the arrangement of the NPN bipolar transistor 113 of FIG. 4B, the p$^+$-type impurity region 26 serves as a contact region for the p-type impurity well 25, and is connected to the terminal T1. Also, the n$^+$-type impurity region $27_1$ is connected to the terminal T5. Further, the n$^+$-type impurity region $27_2$ serves as a contact region for the n-type impurity well region 21, and is connected to the terminal T1.

As symbolically shown in FIG. 4B, a parasitic PNP bipolar transistors Q3 is inevitably defined by the p-type impurity well region 25, the n-type impurity well 21 and the p-type semiconductor substrate 2. Also, similar to the case of FIG. 3, the parasitic NPN bipolar transistor Q2 is inevitably defined by the n-type impurity well 21, the p-type semiconductor substrate 2 and the n$^+$-type source region $24_3$.

In the starting of the charge pump type step-up circuit 11, while the smoothing capacitor C2 is initially charged by applying the power supply voltage $V_{DD}$ to the terminal T1, i.e., while the output voltage $V_{OUT}$ is lower than the power supply voltage $V_{DD}$, the n-type impurity well 21 serves as the collector of the NPN bipolar transistor 113, and the n$^+$-type impurity region $27_1$ serves as the emitter of the NPN bipolar transistor 113, with the p-type impurity well 25 serving as the base of the NPN bipolar transistor 113.

In this case, due to the application of the power supply voltage $V_{DD}$ to the terminal T1, a current flows forwardly from the p$^+$-type impurity region 26 into the n$^+$-type impurity region $27_1$ so that the NPN bipolar transistor 113 is turned ON, whereby the initial charging of the smoothing capacitor C2 can be carried out without turning ON the parasitic PNP bipolar transistor Q3.

When the initial charging of the smoothing capacitor C2 is completed, i.e. when the charged voltage of the smoothing capacitor C2 reaches the power supply voltage $V_{DD}$, the clock signal generator (not shown) commences to input the clock signal CLK to the charge pump circuit 111.

As already explained hereinbefore, by the inputting of the clock signal CLK to the charge pump circuit 111, the output voltage $V_{OUT}$, which is output from the charge pump circuit 111, is stepped up to $2 \cdot V_{DD}$.

As shown in FIG. 4A, when the output voltage $V_{OUT}$ is higher than the power supply voltage $V_{DD}$, the NPN bipolar transistor 113 is changed into an NPN bipolar transistor 113A which is illustrated by broken lines, because both the respective n-type impurity well 21 and the n$^+$-type impurity region 27$_1$ serve as the emitter and collector of the NPN bipolar transistor 113A. In other words, when the output voltage $V_{OUT}$ is higher than the power supply voltage $V_{DD}$, the NPN bipolar transistor 113A is turned OFF so that the parasitic PNP bipolar transistor Q3 cannot be turned ON. Namely, in the charge pump type step-up circuit 11 of FIGS. 4A and 4B, it is possible to prevent an occurrence of a latch-up state in which both the parasitic bipolar transistors Q3 and Q2 are turned ON.

Note, when the n$^+$-type impurity region 27$_1$ serves as the collector of the NPN bipolar transistor 113A, the power supply voltage $V_{DD}$ must be smaller than a break-down voltage of the p-n junction between the p-type impurity well 25 and the n$^+$-type impurity region 27$_1$. For example, the break-down voltage of the p-n junction between the p-type impurity well and the n$^+$-type impurity region 27$_1$ may fall within a range from approximately 6 to approximately 9 volts.

Second Embodiment

Figure 5A:
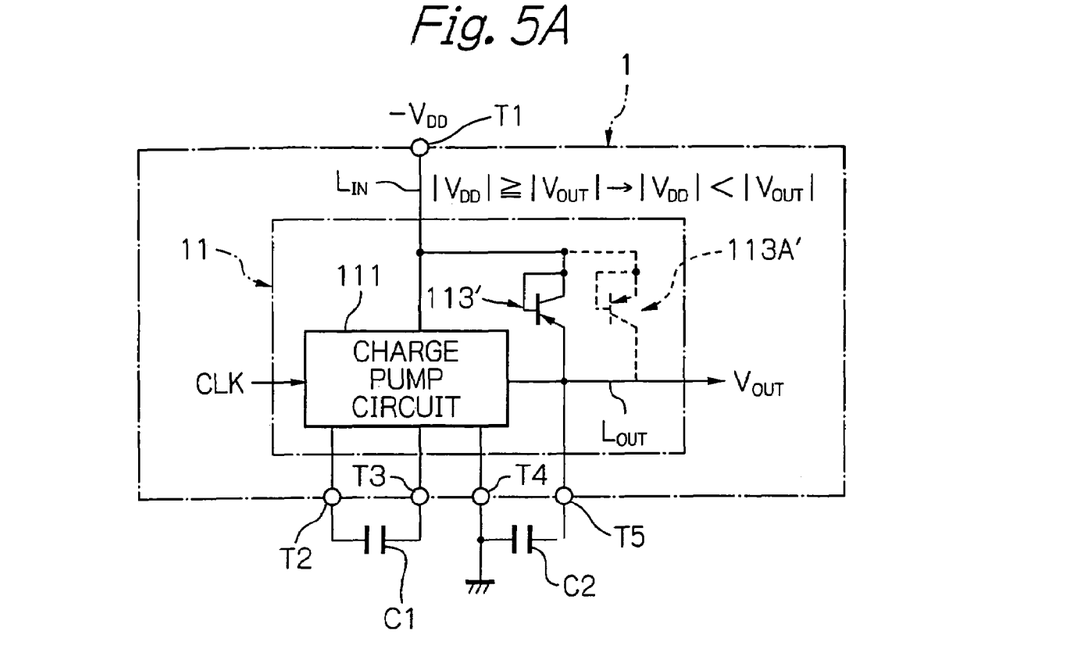
FIG. 5A is a schematic block circuit diagram of a second embodiment of the semiconductor device containing the charge pump type step-up circuit according to the present invention.
Figure 5B:
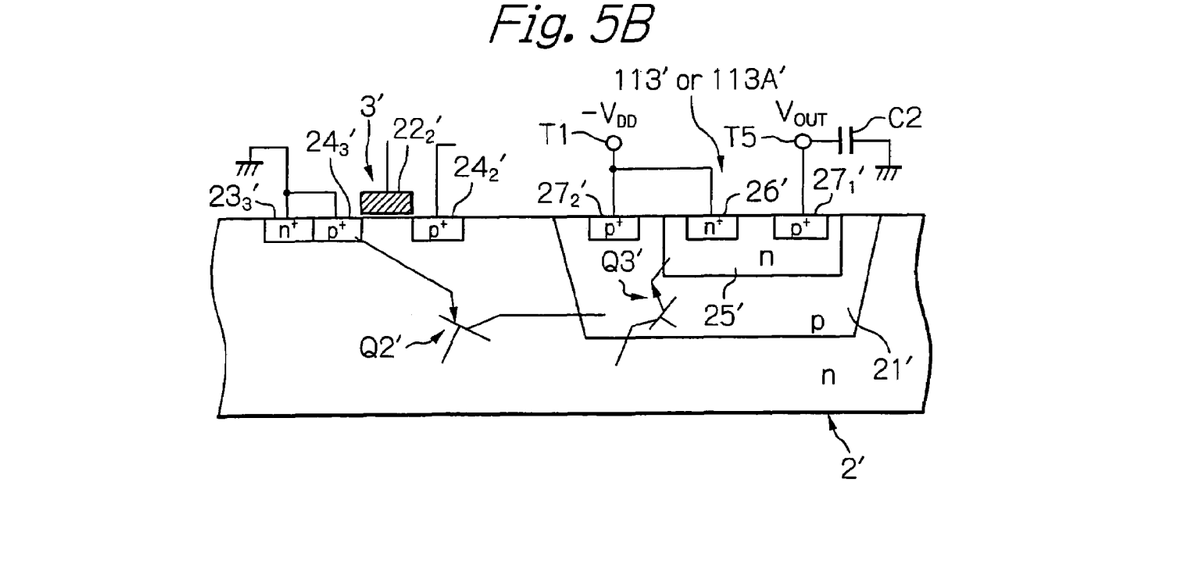
FIG. 5B is a partial cross-sectional view of the semiconductor device of FIG. 5A.

FIGS. 5A and 5B, which respectively correspond to FIGS. 4A and 4B, show a second embodiment of the semiconductor device according to the present invention. Note, in FIGS. 5A and 5B, the same references as in FIGS. 4A and 4B represent the same features, and the like references primed represent like features.

As shown in FIG. 5A, in the second embodiment, a PNP bipolar transistor 113' is substituted for the NPN bipolar transistor 113 of the above-mentioned first embodiment.

Also, as shown in FIG. 5B, in the second embodiment, an n-type semiconductor substrate 2' is substituted for the p-type semiconductor substrate 2 of the above-mentioned first embodiment. The PNP bipolar transistor 113' is formed in the n-type semiconductor substrate 2', and is defined by a p-type impurity well 21' formed in the n-type semiconductor substrate 2', an n-type impurity well 25' formed in the p-type impurity well 21', and a p$^+$-type impurity region 27$_1$' formed in the n-type impurity well 25' and connected to the terminal T5. An n$^+$-type impurity region 26' is formed as a contact region in the n-type impurity well 25', and is connected to the terminal T1. Also, a p$^+$-type impurity region 27$_2$' is formed as a contact region in the p-type impurity well region 21', and is connected to the terminal T1.

In FIG. 5B, one of p-channel type MOS transistors, which are justly formed in the n-type semiconductor substrate 2', is representatively indicated by reference numerals 3'. The formation of the p-channel type MOS transistor 3' is carried out in a similar manner to that as explained with reference to FIG. 3, and the p-channel type MOS transistor 3' is defined by a gate electrode 22$_2$' formed on the n-type semiconductor substrate 2', and two n$^+$-type impurity regions 24$_2$' and 24$_3$' formed in the n-type semiconductor substrate 2'. A p$^+$-type impurity region 23$_3$' is formed as a back gate contact region in the back gate region or the n-type semiconductor substrate 2', and is grounded.

In this p-channel type MOS transistor 3', the gate electrode 22$_2$' is connected to a suitable electronic element (not shown) formed in the n-type semiconductor substrate 2'. Also, the respective n$^+$-type impurity regions 24$_2$' and 24$_3$' are defined as a source region and a drain region. The n$^+$-type source region 24$_2$' is connected to a suitable electronic element (not shown) formed in the n-type semiconductor substrate 2', and the n$^+$-type drain region 24$_3$' is grounded.

Note, the formation of the PNP bipolar transistor 113' may be simultaneously carried out when the p-channel MOS transistor 3' is formed in the n-type semiconductor substrate 2'.

With the aforesaid arrangement of the p-channel type MOS transistor 3' and the PNP bipolar transistor 113', as symbolically shown in FIG. 5B, a parasitic PNP bipolar transistor Q2' is inevitably defined by the p$^+$-type source region 24$_3$', the n-type semiconductor substrate 2' and the p-type impurity well 21', and a parasitic NPN bipolar transistor Q3' is inevitably defined by the n-type semiconductor substrate 2', the p-type impurity well 21' and the n-type impurity well region 25'.

In the starting of the charge pump type step-up circuit 11 of the aforesaid second embodiment, while the smoothing capacitor C2 is initially charged by applying a minus power supply voltage $-V_{DD}$ to the terminal T1, i.e. while an absolute value of the output voltage $V_{OUT}$ is lower than an absolute value of the minus power supply voltage $-V_{DD}$, the p$^+$-type impurity region 27$_1$' serves as the emitter of the PNP bipolar transistor 113', and the p-type impurity well 21' serves as the collector of the PNP bipolar transistor 113', with the n-type impurity well 25' serving as the base of the PNP bipolar transistor 113'.

In this case, due to the application of the minus power supply voltage $-V_{DD}$ to the terminal T1, a current flows forwardly from the p$^+$-type impurity region 27$_1$' into the n-type impurity well or base 25' so that the PNP bipolar transistor 113' is turned ON, whereby the initial charging of the smoothing capacitor C2 can be carried out without turning ON the parasitic NPN bipolar transistor Q3'.

When the initial charging of the smoothing capacitor C2 is completed, i.e. when the charged voltage of the smoothing capacitor C2 reaches the minus power supply voltage $-V_{DD}$, the clock signal generator (not shown) commences to input the clock signal CLK to the charge pump circuit 111.

As already explained hereinbefore, by the inputting of the clock signal CLK to the charge pump circuit 111, the absolute value of the output voltage $V_{OUT}$, which is output from the charge pump circuit 111, is increased to $|-2 \cdot V_{DD}|$.

As shown in FIG. 5A, when the absolute value of the output voltage $V_{OUT}$ is higher than the absolute value of the power supply voltage $V_{DD}$, the PNP bipolar transistor 113' is changed into a PNP bipolar transistor 113A' which is illustrated by broken lines, because both the respective p-type impurity well 21' and the p$^+$-type impurity region 27$_1$' serve as the respective emitter and collector the PNP bipolar transistor 113A'. In other words, when the absolute value of the output voltage $V_{OUT}$ is higher than the absolute value of the power supply voltage $-V_{DD}$, the PNP bipolar transistor 113A' is turned OFF so that the parasitic NPN bipolar transistor Q3' cannot be turned ON. Namely, in the charge pump type step-up circuit 11 of FIGS. 5A and 5B, it is possible to prevent an occurrence of a latch-up state in which both the parasitic bipolar transistors Q3' and Q2' are turned ON.

Note, in the second embodiment of FIGS. 5A and 5B, if an n-channel type MOS transistor is substituted for the PNP bipolar transistor 113', a latch-up state may occur due to a parasitic bipolar transistor involved in the n-channel type MOS transistor.

In the above-mentioned embodiments, although the step-up capacitor C1 and the smoothing capacitor C2 are external to the semiconductor device 1, the step-up capacitor C1 and the smoothing capacitor C2 may be incorporated into the semiconductor device, if necessary.

Finally, it will be understood by those skilled in the art that the foregoing description is of preferred embodiments of the method and the devices, and that various changes and modifications may be made to the present invention without departing from the spirit and scope thereof.

The invention claimed is:

1. A semiconductor device comprising:
   a first-conductivity type semiconductor substrate; and
   a charge pump type step-up circuit formed in said semiconductor substrate and including a charge pump circuit having an input line to which a power supply voltage is to be applied, and an output line through which an output voltage is to be output, said charge pump type step-up circuit further including a bipolar transistor formed in said semiconductor substrate so as to be provided between said input line and said output line,
   wherein said bipolar transistor is constituted so as to be turned ON when an absolute value of said output voltage is lower than an absolute value of said power supply voltage, and so as to be turned OFF when the absolute value of said output voltage is higher than the absolute value of said power supply voltage.

2. The semiconductor device as set forth in claim 1, wherein said bipolar transistor is formed as a vertical type bipolar transistor.

3. The semiconductor device as set forth in claim 1, wherein said bipolar transistor is defined by a second conductivity type well formed in said first conductivity type semiconductor substrate, a first conductivity type well formed in said second conductivity type well, and a second conductivity type region formed in said first conductivity type well, said second conductivity type well and said first conductivity type well being connected to said input line, said second conductivity type region being connected to said output line.

4. The semiconductor device as set forth in claim 3, wherein said first conductivity type is of a p-type, and wherein said second conductivity type is of an n-type.

5. The semiconductor device as set forth in claim 4, wherein said bipolar transistor has a first terminal connected to said input line, a second terminal connected to said output line, and a base terminal connected to said input line, said first and second terminals serving as respective collector and emitter terminals when the absolute value of said output voltage is lower than the absolute value of said power supply voltage, said bipolar transistor being changed into a bipolar transistor, in which said first and second terminals serve as respective emitter and collector terminals, when the absolute value of said output voltage is higher than the absolute value of said power supply voltage.

6. The semiconductor device as set forth in claim 3, wherein said first conductivity type is of an n-type, and wherein said second conductivity type is of a p-type.

7. The semiconductor device as set forth in claim 6, wherein said bipolar transistor has a first terminal connected to said input line, a second terminal connected to said output line, and a base terminal connected to said input line, said first and second terminals serving as respective collector and emitter terminals when the absolute value of said output voltage is lower than the absolute value of said power supply voltage, said bipolar transistor being changed into a bipolar transistor, in which said first and second terminals serve as respective emitter and collector terminals, when the absolute value of said output voltage is higher than the absolute value of said power supply voltage.

8. The semiconductor device as set forth in claim 1, wherein said charge pump circuit is adapted to be connected to a step-up capacitor so that said step-up capacitor is charged with said power supply voltage to thereby produce a stepped-up voltage which is to be output through said output line, and wherein said bipolar transistor is adapted to be connected to a smoothing capacitor so that said smoothing capacitor is initially charged with the power supply voltage while said bipolar transistor is turned ON.

9. The semiconductor device as set forth in claim 8, further comprising first, second, third, fourth and fifth terminals, said input line being connected to said first terminal, two respective terminals of said step-up capacitor being adapted to be connected to said second and third terminals, said charge pump circuit being adapted to be grounded through said fourth terminal, one terminal of said smoothing capacitor being adapted to be grounded, another terminal of said smoothing capacitor being adapted to be connected to said output line and the second terminal of said bipolar transistor through said fifth terminal.

10. The semiconductor device as set forth in claim 8, wherein said step-up capacitor and said smoothing capacitor are external to said semiconductor device.

11. A charge pump type set-up circuit formed in a first conductivity type semiconductor device, which circuit comprises:
    a charge pump circuit having an input line to which a power supply voltage is to be applied, and an output line through which an output voltage is to be output; and
    a bipolar transistor provided between said input line and said output line,
    wherein said bipolar transistor is constituted so as to be turned ON when an absolute value of said output voltage is lower than an absolute value of said power supply voltage, and so as to be turned OFF when the absolute value of said output voltage is higher than the absolute value of said power supply voltage.

12. The charge pump type set-up circuit as set forth in claim 11, wherein said bipolar transistor is formed as a vertical type bipolar transistor.

13. The charge pump type set-up circuit as set forth in claim 11, wherein said bipolar transistor is defined by a second conductivity type well formed in said first conductivity type semiconductor substrate, a first conductivity type well formed in said second conductivity type well, and a second conductivity type region formed in said first conductivity type well, said second conductivity type well and said first conductivity type well being connected to said input line, said second conductivity type region being connected to said output line.

14. The charge pump type set-up circuit as set forth in claim 13, wherein said first conductivity type is of a p-type, and wherein said second conductivity type is of an n-type.

15. The charge pump type set-up circuit as set forth in claim 14, wherein said bipolar transistor has a first terminal connected to said input line, a second terminal connected to said output line, and a base terminal connected to said input line, said first and second terminals serving as respective collector and emitter terminals when the absolute value of said output voltage is lower than the absolute value of said power supply voltage, said bipolar transistor being changed into a bipolar transistor, in which said first and second terminals serve as respective emitter and collector terminals, when the absolute value of said output voltage is higher than the absolute value of said power supply voltage.

16. The charge pump type set-up circuit as set forth in claim 13, wherein said first conductivity type is of an n-type, and wherein said second conductivity type is of a p-type.

17. The charge pump type set-up circuit as set forth in claim 16, wherein said bipolar transistor has a first terminal connected to said input line, a second terminal connected to said output line, and a base terminal connected to said input line, said first and second terminals serving as respective collector and emitter terminals when the absolute value of said output voltage is lower than the absolute value of said power supply voltage, said bipolar transistor being changed into a bipolar transistor, in which said first and second terminals serve as respective emitter and collector terminals, when the absolute value of said output voltage is higher than the absolute value of said power supply voltage.

18. The charge pump type set-up circuit as set forth in claim 11, wherein said charge pump circuit is adapted to be connected to a step-up capacitor so that said step-up capacitor is charged with said power supply voltage to thereby produce a stepped-up voltage which is to be output through said output line, and wherein said bipolar transistor is adapted to be connected to a smoothing capacitor so that said smoothing capacitor is initially charged with the power supply voltage while said bipolar transistor is turned ON.

19. The charge pump type set-up circuit as set forth in claim 18, further comprising first, second, third, fourth and fifth terminals, said input line being connected to said first terminal, two respective terminals of said step-up capacitor being adapted to be connected to said second and third terminals, said charge pump circuit being adapted to be grounded through said fourth terminal, one terminal of said smoothing capacitor being adapted to be grounded, another terminal of said smoothing capacitor being adapted to be connected to said output line and the second terminal of said bipolar transistor through said fifth terminal.

20. The charge pump type set-up circuit as set forth in claim 18, wherein said step-up capacitor and said smoothing capacitor are external to said semiconductor device.

* * * * *